United States Patent [19]

Cabaret et al.

[11] Patent Number: 5,033,058
[45] Date of Patent: Jul. 16, 1991

[54] ROD LASER WITH OPTICAL PUMPING FROM A SOURCE HAVING A NARROW EMITTING AREA

[75] Inventors: Louis Cabaret, Dourdan; Geneviève Girard, Jouy en Josas; Pierre Pinson, Briis Sous Forges; Thibaut De Saxce, Palaiseau, all of France

[73] Assignee: Laserdot, Paris, France

[21] Appl. No.: 460,451

[22] Filed: Jan. 3, 1990

[30] Foreign Application Priority Data

Jan. 4, 1989 [FR] France ............................ 89 00044

[51] Int. Cl.$^5$ .............................................. H01S 3/91
[52] U.S. Cl. ......................................... 372/75; 372/35; 372/72; 372/70; 372/92; 372/99
[58] Field of Search .................... 372/69, 70, 99, 103, 372/35; 378/75, 78, 101, 92, 107, 108

[56] References Cited

U.S. PATENT DOCUMENTS

| | | | |
|---|---|---|---|
| 3,140,451 | 8/1964 | Fox | 372/66 |
| 3,222,615 | 12/1965 | Holly | 372/66 |
| 3,663,893 | 5/1972 | Ostermayer, Jr. | 372/75 |
| 3,683,296 | 8/1972 | Scalise | 372/75 |
| 3,684,980 | 9/1972 | Kay | 372/75 |
| 3,821,663 | 6/1974 | Brenner | 372/75 |
| 4,756,002 | 7/1988 | Ruggieri et al. | 372/72 |

Primary Examiner—Léon Scott, Jr.
Attorney, Agent, or Firm—Sughrue, Mion, Zinn, Macpeak & Seas

[57] ABSTRACT

Pumping laser diodes (3) are disposed around a reflector tube (2) having narrow windows (14) through which the emitting areas of the diodes look. The tube leaves an angular gap (16) around a rod to be pumped (1) and a cooling liquid flows in said gap. The invention is particularly applicable to optically pumping a YAG rod.

11 Claims, 4 Drawing Sheets

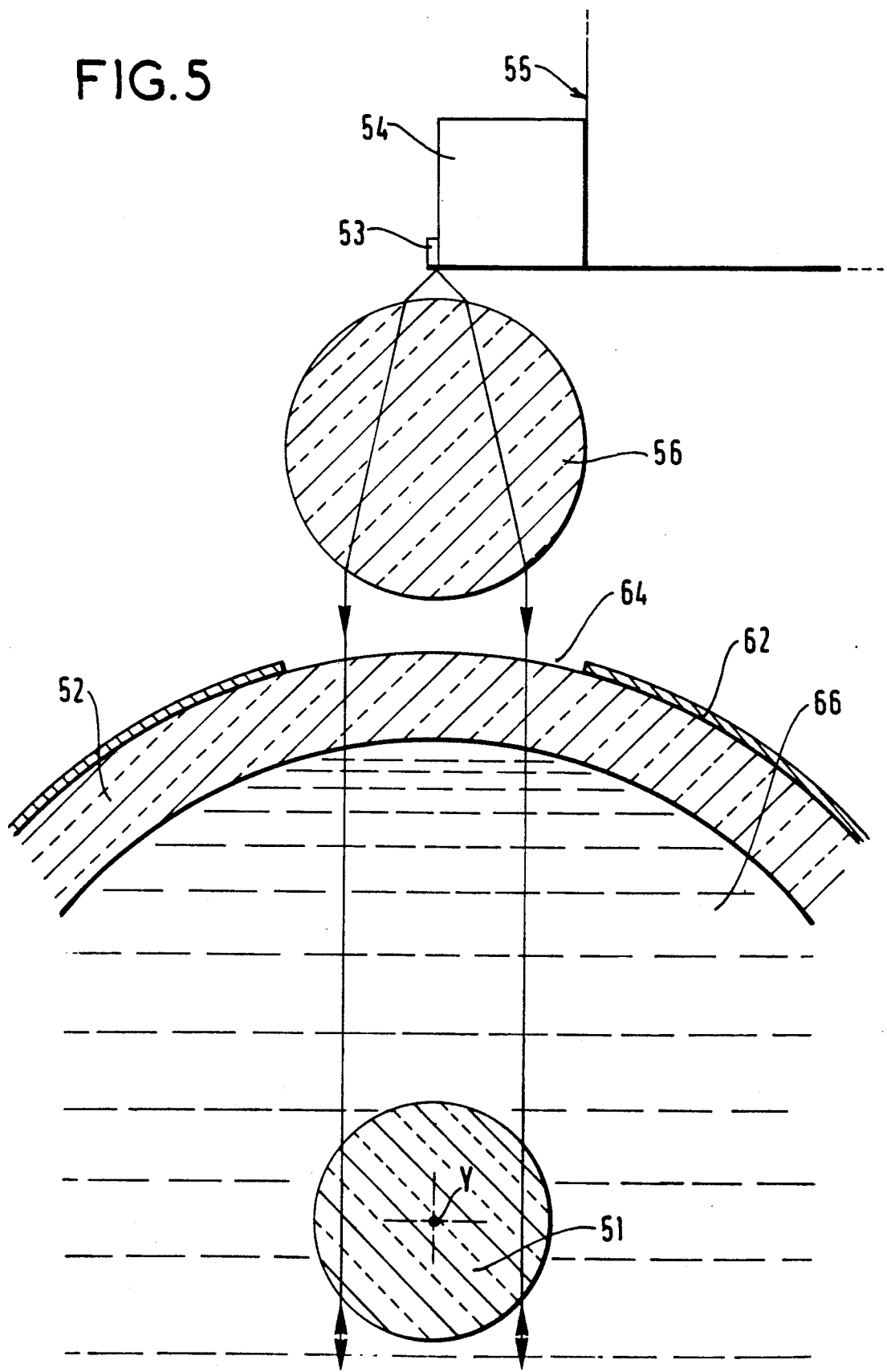

ROD LASER WITH OPTICAL PUMPING FROM A SOURCE HAVING A NARROW EMITTING AREA

The present invention relates to making an optically pumped laser whose active medium is in the form of a rod. One known way of providing pumping light sources for such a laser is to use diodes. One such diode is constituted by a semiconductor plate which emits light from a narrow emitting area whose two dimensions may be 1000 nm by 10 mm, for example. The pumping beam formed then has divergent angles of about 80° and 20°.

BACKGROUND OF THE INVENTION

A prior art using such pumping sources includes certain essential items in common as to their functions mentioned below with a laser of the present invention.

These essential items in common are the following:

an elongate laser rod having a longitudinal axis defining radial and circumferential directions in transverse planes, the material of the rod being suitable for absorbing pumping light in order to amplify longitudinally propagating light to be amplified;

at least one pumping source for emitting a pumping beam of said pumping light from an emitting area whose small circumferential width requires said laser to form an angle of divergence in one of said transverse planes, at least initially; and 7 a reflector surrounding said rod while leaving at least one window to pass said pumping beam and constitute a light trap in which a fraction of said light that is not absorbed during a first passage through said rod is returned towards said rod for a subsequent pass.

One such prior laser is described in the article "Laser diode side pumping of neodymium laser rods," by F. Hanson and D. Haddock, published in Applied Optics, Vol. 27, No. 1, Jan. 1, 1988.

The reflector of this laser serves to increase the overall energy efficiency of the laser firstly by reducing losses of pumping light to the outside from the laser, and secondly by improving the uniformness of pumping, i.e. by making the power density of the pumping light more uniform in the volume of the laser rod, and more particularly across its cross-section.

Nevertheless, it remains desirable to further increase the efficiency of such a laser and also to make it more compact, i.e. to increase the ratio of the light power it is capable of delivering divided by its overall volume.

The present invention seeks in particular to avoid losses of pumping light to the outside from such a laser, to increase pumping uniformness, and also to provide a laser which is more compact.

SUMMARY OF THE INVENTION

A laser in accordance with the present invention includes the essential items in common mentioned above, together with at least some of the following preferred dispositions:

said reflector leaves an annular gap around said rod, said gap having a gap width extending along said radial direction, said emitting area of said pumping source being disposed outside said reflector and looking through said window in such a manner that said rod is contained substantially within said pumping beam;

the laser includes means for causing a cooling fluid to flow along said angular gap, said fluid preferably flowing longitudinally, this dispostion ensures that the laser rod is cooled effectively and simply, thereby making it possible to increase the pumping power which is injected into the rod, and thus increase the power of the light beam that it delivers;

the pumping source presents its said emitting area close to said window so that the distance between said source and said rod is substantially equal to said gap width, which width is sufficiently large to ensure that said rod is contained substantially in said angle of divergence, with said width being simultaneously sufficiently small for said rod to occupy substantially all of the angular extent of said angle of divergence, these dispositions serving simultaneously to obtain good pumping uniformness and to minimize losses of pumping light;

in a variant, the laser includes a divergence-reducing lens disposed between said pumping source and said window in order to reduce or eliminate the divergence angle of said pumping beam;

the laser includes a plurality of said pumping sources following one another longitudinally, with said divergence-reducing lens being in the form of a cylinder having longitudinally-extending generator lines and preferably being circular in section;

the laser preferably includes an odd number of said pumping sources regularly disposed angularly about said axis of said laser rod, the said reflector having the same odd number of said windows and of said reflecting areas between said windows, with the angular extent of said reflecting areas being not less than the angular extent of said windows;

the said reflector is in the form of a glass tube coaxially surrounding said rod and carrying a reflecting coating on its outside surface, said coating being interrupted locally in order to form one of said windows, this disposition makes it possible both to provide the reflector in simple manner and to channel the longitudinal flow of cooling fluid in said glass tube, which fluid may be constituted by water, for example; and said pumping source emits pumping light at a central frequency which is spectrally offset relative to said absorption peak, with the spectral offset being selected to be large enough to improve the uniformness of said pumping by increasing the mean number of reflections to which said pumping light is subjected on said reflector, the offset is simultaneously selected to be sufficiently small to ensure that this number of reflections does not significantly reduce the energy efficiency of the pumping due to the partial absorption of light that occurs on each reflection, for example the offset may be selected so that the mean number of pumping light reflections in the light trap lies in the range 2 to 4.

BRIEF DESCRIPTION OF THE DRAWINGS

An implementation of the present invention lying within the above outline is described in greater detail below by way of non-limiting example and with reference to the accompanying diagrammatic figures. When the same item appears in several figures, it is designated in all of them by the same reference signals. The embodiment given by way of example includes the dispositions mentioned above as being preferred. It should be understood that the items mentioned may be replaced by other items which the same technical functions.

FIG. 5 is a fragmentary view on a larger scale showing a detail of FIG. 4.

DETAILED DESCRIPTION

Figure 1:
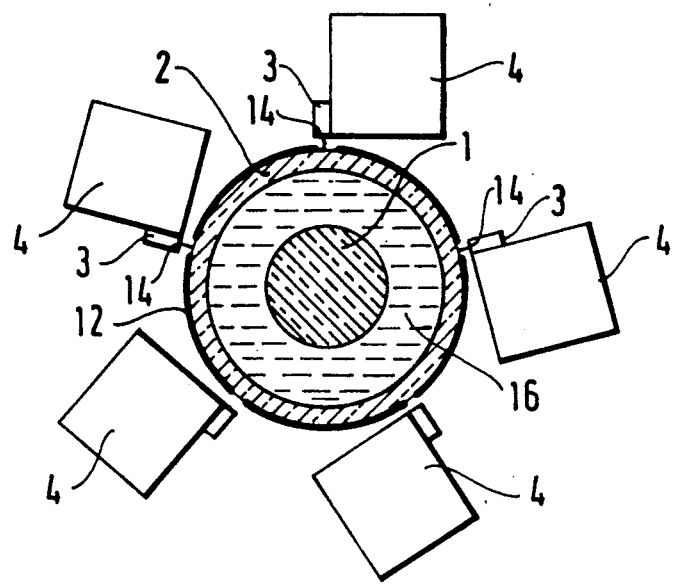
FIG. 1 is a cross-section view through a first laser of the invention.
Figure 2:
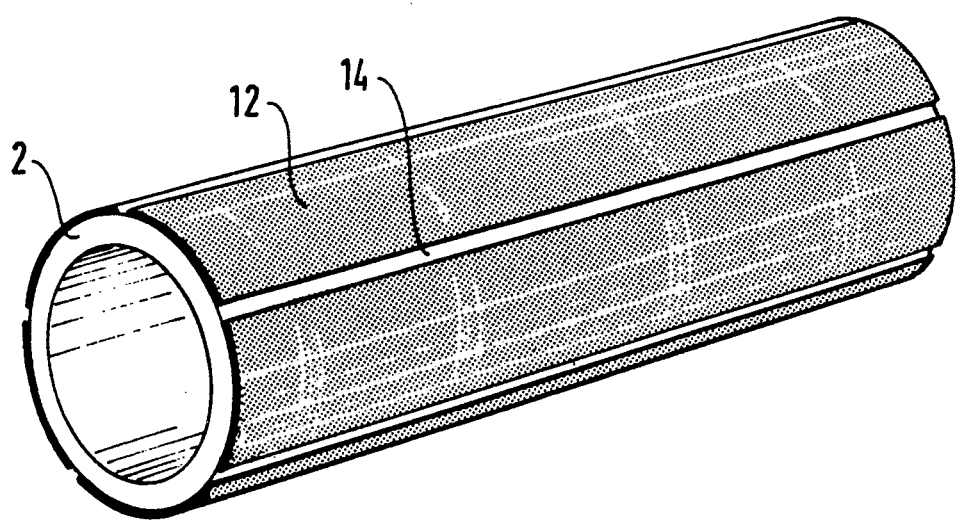
FIG. 2 is a perspective view of the reflector of the laser.
Figure 3:
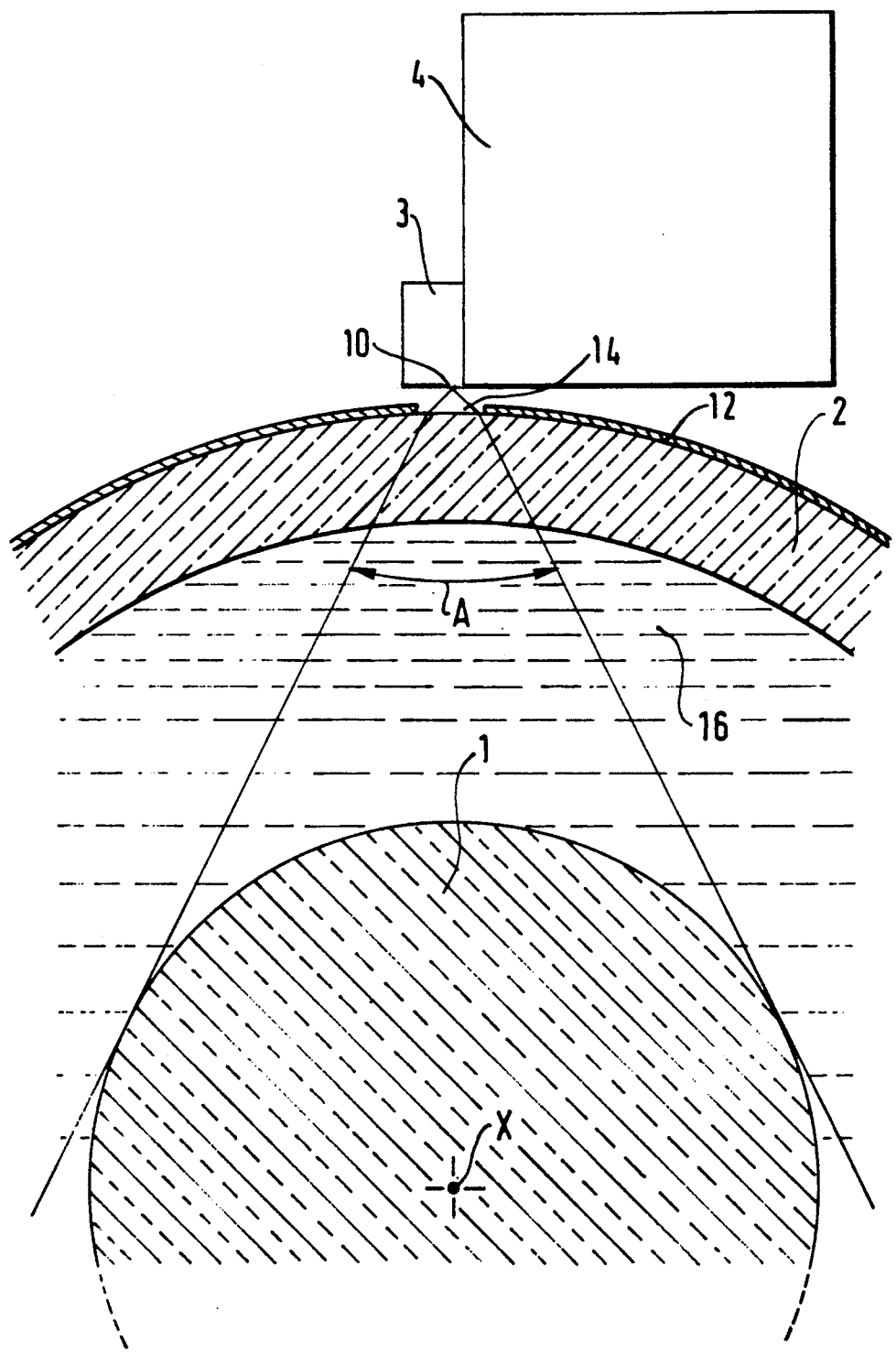
FIG. 3 is a fragmentary view on a larger scale showing a detail of FIG. 1.

In FIGS. 1 to 3, the said rod is referenced 1 and its axis is referenced X. The diameter of the rod may be relatively large, e.g. greater than 5 mm. The said pumping sources are constituted by laser diodes such as 3 mounted on bases such as 4 and having emitting areas such as 10. The temperature of the bases is regulated by means of conventional cooling circuits (not shown).

The diodes are distributed in longitudinal rows and the rows are themselves angularly distributed around the rod.

However, the sources could be different in nature as could their emitting areas, for example the emitting areas could be constituted by the ends of optical fibers conveying pumping light produced at a distance from the reflector.

The reflector is constituted by a glass tube 2 and its reflecting coating is constituted by metallization 12 whose reflectance is made as high as possible, which reflector is interrupted by windows such as 14. The annular gap 16 is occupied by a cooling fluid which flows parallel to the axis X.

Figure 4:
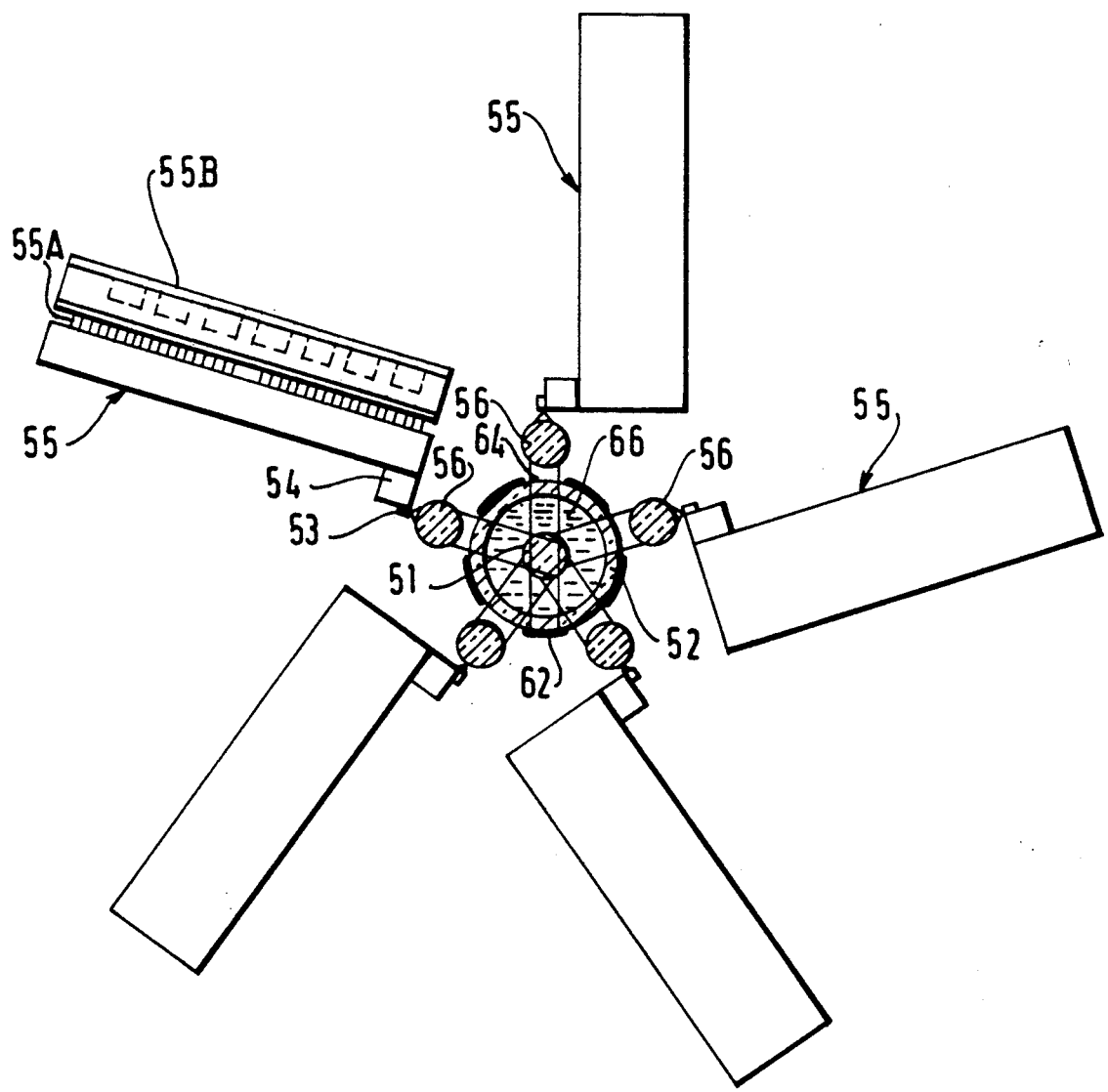
FIG. 4 is a cross-section through a second laser of the invention.

In FIGS. 4 and 5, the rod of said second laser is referenced 51. Its diameter is relatively small, e.g. 2 mm to 3 mm.

The pumping sources are constituted by laser diodes such as 53 which are analogous to the diodes 3 and which are soldered onto bases such as 54, which bases are in turn mounted on temperature regulation copper plates such as 55 of conventional type and provided with Peltier effect elements 55A associated with radiators 55B.

The beam emitted by such a laser diode passes through a cylindrical lens such as 56 whose section is circular, for example, having a diameter which may be slightly greater than that of the laser rod 51, e.g. 3 mm to 4 mm. The generator lines of these lenses lie parallel to the axis Y of the laser rod. They transform the divergent beams emitted by the diodes 53 into parallel beams.

The reflector is constituted by a glass tube 52 and its reflecting coating is constituted by areas of metallization such as 62 separated by windows such as 64.

The number of reflector areas is odd, e.g. three, five, or seven, the angular extent of each reflecting area is substantially equal to or slightly greater than the angular extent of each window, thereby enabling each area of metallization to receive in full a parallel beam coming from the diametrically opposite window.

The angular gap 66 has a cooling liquid flowing therealong parallel to the axis Y.

These dispositions make it possible to obtain the following advantages:

Since the laser diodes are at a distance from the rod, there are no zones in the rod subjected to particularly high pumping, whereas such zones do exist in lasers whose pumping laser diodes are placed close to the rod.

Since the laser diodes are not tuned to the absorption peak of the pumped material, several passes through the rod are required before all of the light emitted by the laser diodes is absorbed. This improves the uniformness of pumping. In addition, wide-spectrum laser diodes may be used without it being necessary for their spectrum to be accurately centered on the absorption peak of the rod material. The use of such diodes has the further advantage that their temperature regulation is less critical than for other diodes.

When operating at high mean power, the glass tube makes it possible to cool the rod effectively by the flow of a cooling liquid.

In the cylindrical configuration shown, the heat sinks on which the laser diodes are fixed can increase in section going away from the center of the tube. This makes it easier to fit Peltier elements, for example.

By way of numerical example, a laser according to FIGS. 1 to 3, may be mentioned whose active material is of the $Nd^{3+}$ YAG type providing an average power of 100 W:

rod diameter: 6.35 mm
length: 100 mm
absorption peak: 807 nm
glass tube: diameter 13 mm, thickness 2 mm
circumferential width of the windows: 0.2 mm
power of each laser diodes: 10 W
circumferential width of their emitting areas: 1000 nm
wavelength at central emission frequency: 807 nm
number of 10 W laser diodes required: 40 eight laser diodes of length 10 mm, or the outlets of 8 sheets of fibers are distributed along a common horizontal row five such rows surround the tube 2 whose windows are 0.2 mm wide, thereby giving rise to a loss of pumping light to the outside of about 2.5% electrical power required, about 1 kW.

It is claimed:

1. A rod laser with optical pumping from a source having a narrow emitting area, the laser comprising:
    an elongate laser rod having a longitudinal axis defining radial and circumferential directions in transverse planes, the material of the rod absorbing pumping light in order to amplify longitudinally propagating light to be amplified;
    at least one pumping source having an emitting area of small circumferential width emitting a substantially radial pumping beam of said pumping light from said emitting area such that said pumping beam forms an angle of divergence at least initially in one of said transverse planes; and
    a cylindrical reflector surrounding said rod and including at least one window to pass said pumping beam and constituting a light trap in which a fraction of said light, not absorbed during a first passage through said rod, is returned towards said rod for a subsequent pass; and
    wherein said reflector forms with said rod an annular gap, said annular gap having a gap width in a radial direction, said emitting area of said pumping source being disposed outside said reflector and facing said window such that said rod is contained substantially within said pumping beam thereby producing a laser which has enhanced pumping uniformness and which minimizes pumping losses.

2. A laser according to claim 1, including means for causing a cooling fluid to flow through said annular gap.

3. A laser according to claim 2, wherein the cooling fluid is caused to flow longitudinally.

4. A laser according to claim 1, wherein said pumping source presents said emitting area close to said window such that the distance from said source to said rod is substantially equal to said gap width, an said gap width is sufficiently large for said rod to be contained substantially in said angle of divergence.

5. A laser according to claim 4, wherein said gap width is sufficiently small for said rod to occupy substantially all of the angular extent of said angle of divergence.

6. A laser according to claim 1, further including a divergence-reducing lens disposed between said pumping source and said window in order to at least reduce the angle of divergence of said pumping beam.

7. A laser according to claim 6, wherein a plurality of pumping sources follow one another longitudinally, and said divergence-reducing lens is cylindrical in shape having longitudinally extending generator lines.

8. A laser according to claim 7, wherein said divergence-reducing lens is circular in section.

9. A laser according to claim 6, wherein an odd number of said pumping sources are regularly distributed angularly around said axis of said laser rod, said reflector has the same odd number of windows and reflecting areas between said windows, and said reflecting areas occupy angular extents substantially equal to or slightly greater but not less than the circumferential extent of said windows.

10. A rod laser with optical side pumping, said laser comprising:

an elongate laser rod having a longitudinal axis defining radial and circumferential directions in transverse planes, said rod being of a material which absorbs pumping light in order to amplify longitudinally propagating light to be amplified;

a cylindrical reflector surrounding said rod and spaced radially from said rod by an annular gap having a constant radial gap width;

at least one pumping source having an emitting area with a small circumferential width outside said reflector and emitting a substantially radial pumping beam of said pumping light from said emitting area, said pumping beam having a positive or nul angle of divergence in one of said transverse planes, said reflector having at least one window passing said pumping beam and constituting a light rap in which an unabsorbed portion of such pumping beam is reflected towards said rod, and said emitting area facing said window so that the rod is contained substantially within said pumping beam thereby producing a laser which has enhanced pumping uniformness and which minimizes pumping losses.

11. A rod laser according to claim 10, wherein said reflector is a glass tube with a metallized reflecting coating thereon.

* * * * *